United States Patent Office 3,208,515
Patented Sept. 28, 1965

3,208,515
METHOD OF RECOVERING OIL FROM
UNDERGROUND RESERVOIRS
Victor G. Meadors, Tulsa, Okla., assignor, by mesne assignments, to Esso Production Research Company, Houston, Tex., a corporation of Delaware
No Drawing. Filed Jan. 21, 1959, Ser. No. 788,039
21 Claims. (Cl. 166—9)

The present invention is broadly concerned with the recovery of oil from subterranean oil reservoirs. More particularly the invention concerns an improved flooding procedure in which a viscous fluid is employed as a driving medium. The invention especially relates to a method of oil recovery in which a viscous water and oil emulsion is used to displace oil and in which the continuous phase of the emulsion has been thickened.

It is a well known practice in the petroleum industry, when an underground oil reservoir lacks sufficient natural oil driving means to maintain an economical oil production rate, to inject an oil displacing fluid into the reservoir. Thus, it has been the practice for some time to inject a gas or a water into one or more injection wells in the reservoir so as to displace oil from the reservoir to one or more production wells. Methods of this type are generally referred to as methods of secondary recovery. The particular technique of using water is generally described as waterflooding. The present invention relates particularly to the technique of "flooding."

While conventional waterflooding is effective in obtaining additional oil from subterranean oil reservoirs, it has a number of shortcomings which detract seriously from its value. Foremost among these shortcomings is the tendency of flood water to "finger" through a reservoir and to bypass substantial portions of the reservoir. In other words, a water drive has a less than perfect "sweep" efficiency in that it does not contact all portions of a reservoir. Furthermore it does not normally displace as much oil from the portions of a reservoir which it contacts as it theoretically is capable of doing.

This fingering tendency of the waterflood is usually explained by the fact that oil reservoirs possess regions and strata that have different permeabilities. The water flows more rapidly through those regions and strata having a greater relative permeability to water than through other portions of the reservoir. Waterflooding often completely misses substantial portions of a reservoir. The net result is an inefficient oil displacement action on the part of the water. At this point it should be noted that crude oils vary greately in viscosity—some being as low as 1 or 2 cps. and some ranging up to 1000 cps. or even more. It has been established that waterflooding performs less satisfactorily with viscous crude oils than with relatively nonviscous oils. In other words, the fingering and bypassing tendencies of the water drive are more or less directly related to the ratio of the viscosity of the reservoir oil to the viscosity of the aqueous driving medium.

Also of interest at this point is a mathematical relationship that has been developed in recent years to help explain the behavior of fluids flowing through porous media such as oil reservoirs. This equation when applied to a "flooding" type operation within an oil reservoir reads as follows.

$$\frac{M_o}{M_e} = \frac{\mu_e}{\mu_o} \cdot \frac{K_o}{K_e}$$

where $M_o$ is the mobility of the oil to the reservoir in question.
$M_e$ is the mobility of the driving fluid to the reservoir in question.
$\mu_o$ is the viscosity of the driven oil.
$\mu_e$ is the viscosity of the driving fluid.
$K_e$ is the relative permeability of the reservoir toward the driving fluid in the presence of oil.
$K_o$ is the relative permeability of the reservoir toward the oil in the presence of connate water.

This equation is perhaps best explained by stating that when the mobility ratio of oil to the driving fluid within a reservoir is equal to one, the oil and driving fluid move through the reservoir with equal ease. Substantially equilibrium proportions of driving fluid and oil remain within the reservoir as soon as the driving fluid has passed therethrough. Expressed otherwise, the mobility ratio term affords a measure of the volume of driving fluid and the amount of time that are required to reduce the oil content of the reservoir to an ultimate equilibrium value. For example, a given volume of driving fluid operating at a mobility ratio of one will displace a markedly greater volume of oil from a reservoir than will an equal volume of driving fluid operating at a mobility of less than one.

Accordingly it is an object of this invention to provide an improved type of displacement process in which a marked increase in the viscosity of the driving fluid may be readily obtained. It is also an object of the invention to provide a viscous displacing fluid in which the increased viscosity is obtained inexpensively. It is still a further object of the invention to use a driving fluid whose viscosity is stable and can be adjusted over a wide range.

These and related objects which will be expressly discussed or readily apparent from the following description, are realized in accordance with this invention by use of a viscous water and oil emulsion in which the continuous phase of the emulsion has been thickened, i.e., made more viscous. The emulsion may comprise the entire body of driving fluid or alternatively may be only a portion of the driving fluid. In the latter event, however, the emulsion should be incorporated within the front portion of the flood. In any case, the emulsion should be located within the leading portion of the fluid drive in order that the effect of the resulting viscosity increase may be fully exploited. When the emulsion is only incorporated within the leading portion of the fluid drive the quantity of the emulsion should be sufficient to prevent the trailing relatively nonviscous water from breaking through the emulsion and contacting the reservoir oil directly. A minimum quantity of emulsion to be used as a bank in front of the driving water in any given reservoir will depend on such well recognized factors as the flooding pattern, the distance between wells, the viscosity of the oil, and so forth. In most reservoirs it is contemplated that the volume of emulsion should be at least about 25% of the pore volume of the reservoir contacted by the emulsion.

As to the portion of the reservoir contacted by the emulsion, it is assumed that the pore volume contacted is normally in the range of about 75 to 95% of the pore volume of the reservoir (or portion thereof) being flooded. Since it is conventional practice to carry out flooding operations using certain regular flooding patterns, it may be convenient in such instances to define the volume of the reservoir under flood as the volume underlying the lateral area defined by one or more patterns. To illustrate, in "line drive floods" it is assumed that the pore volume contacted is normally in the range of about 75 to 95% of the pore volume of the reservoir underlying the lateral area between the line of injection wells and the line of producing wells.

With regard to the water and oil emulsion to be employed in this invention the emulsion may, for convenience, be divided into two general classifications, (1)

a water-in-oil emulsion in which the continuous phase is oil and the disperse phase is water and (2) an oil-in-water emulsion in which water is the continuous phase and oil is in the dispersed phase. The emulsion may, if desired, contain a conventional emulsifying agent although it is not essential. In accordance with this invention the continuous phase is made more viscous by the addition of a thickener. The viscosity of the emulsion may vary as desired but it is generally preferred that the viscosity not exceed about 1000 centipoises in any case. The thickener may be added to the continuous phase first and then the emulsion formed in a conventional manner. On the other hand if it is desired, the emulsion may be prepared first. The thickener may then be added to a relatively small amount of the medium which is in the continuous phase and then added to the emulsion.

In regard to the thickener any thickener may be used to thicken the continuous phase fluid of the emulsion that is capable of increasing the viscosity of the fluid and is stable at reservoir temperature. The thickened fluid must be of a character that may be injected into the reservoir without plugging the pores.

When water is the fluid forming the continuous phase of the emulsion, suitable thickeners are natural or synthetic water soluble gum, such as polyacrylic acid, salts of alginic acid, or copolymers of maleic anhydride with an olefin. Finely divided solids which may be either hydrophilic or hydrophobic such as montmorillonite, carbon black, zinc oxide, or the like may be added to the continuous phase whether it is water or oil for increasing the viscosity of the continuous phase. If desirable, the finely divided solids may be pretreated to render it strongly oil wet or strongly water wet as may be preferred. The type of emulsion formed can be controlled by suitable pretreatment of this sort. For example, bentonite, pretreated with a methyl chlorosilane to render it oil wet, will promote the formation of water-in-oil emulsion, while untreated bentonite favors a formation of oil-in-water emulsions.

The thickeners make the emulsion more stable due to (1) a mechanical effect and also (2) a film forming effect. In regard to the mechanical effect the thickener increases the viscosity of the continuous phase which decreases the rate of creaming of the dispersed particles. In regard to the film forming effect the thickener forms a film on the dispersed droplets so that the droplets will not tend to coalesce when the droplets hit or collide.

When the continuous phase of the emulsion is water it is especially preferred to use thickeners that are ionic, i.e., will ionize in water. Examples of an especially preferred ionic thickener are polyacrylic acid or polymethacrylic acid. In addition to making the emulsion more stable due to a mechanical effect and a film forming effect the ionic thickeners set up like charges on the dispersed particles which tend to repel the particels, thus making the emulsion even more stable.

In addition to making the emulsion more stable there is an economic incentive for the use of the thickeners. The thickeners will permit the use of much lower quantities of emulsifying agents and in some cases will permit the emulsifying agent to be eliminated completely. Many thickeners may normally be obtained at a lower cost than emulsifying agents. A judicious choice of thickeners will thus result in an economic advantage.

It will be noted that the displacement of oil by a water-in-oil emulsion is a miscible like displacement system. In a miscible system $K_o$ and $K_e$ are equal. Therefore the mobility ratio of $M_o/M_e$ of the oil to the driving medium is equal to $\mu_e/\mu_o$, the ratio of the viscosity of the driving medium to the viscosity of the oil. As it is normally desired to have $M_o/M_e$ approximately one, it is seen that the viscosity of the driving fluid in miscible displacement processes should be approximately equal to the viscosity of the oil reservoir. Therefore the desired viscosity of the water-in-oil emulsion will be preferably in the range of from about 2 centipoises to about 1000 centipoises. However, from a practical viewpoint the emulsion preferably should have a viscosity of at least about 4 centipoises at 60° F.

Wherever possible and feasible, it is preferred that the viscosity of the emulsion be adjusted such that the mobility ratio of the emulsion and the reservoir oil approach a value of one. It is to be noted that a mobility ratio of greater than one normally returns very little in the way of additional oil recoveries; but at ratios less than one, oil recoveries fall off quite rapidly. The amount of water by weight may vary from about one to about twenty times the weight of the oil in the emulsion. However, it is normally preferred that there be about ten times as much water as oil in the emulsion. An emulsifying agent if used will normally comprise between about 0.1 and about 5.0 percent of the weight of the emulsion. The thickeners will normally comprise between about 0.05 and about one percent of the weight of the emulsion.

The water used in the emulsion may be fresh water, brackish water, or water similar to that in the reservoir. The oil used in the emulsion may be crude oil or even light oil such as naphtha and kerosenes. Suitable thickeners have been described hereinbefore. Suitable emulsifying agents for water-in-oil emulsions are sorbitan mono-oleate, calcium oleate, benzyl cellulose, lanolin and the like. Suitable emulsifying agents for oil-in-water emulsions are water soluble polyethoxylated nonyl phenol, stearyl trimethyl ammonium acetate, sodium dioctylsulfosuccinate, polyoxyethylated sorbitan mono-stearate, morpholine oleate, lauryl sulfate, and sodium (diisobutyl) benzene sulfonate. In regard to emulsifying agents reference is made to "Emulsions, Theory and Practice," by Becher and published by Reinhold Publishing Corp., New York, U.S.A., copyright 1957.

In carrying out the method of invention, any given reservoir is provided in a conventional manner with a predetermined number of injection wells and production wells. It will be noted at this point that the invention is adapted to line drive flooding techniques as well as to the techniques that employ five spot patterns, seven spot patterns, and the like.

After the desired number of injection and production wells have been prepared, the water-in-oil emulsion is introduced into the oil reservoir through the injection wells. As noted earlier, the viscosity of the solution is preselected preferably such that the mobility ratio of the emulsion to the reservoir oil is approximately one.

When speaking of the viscosity of the emulsion and the reservoir oil the viscosity referred to are those existing within the reservoir. The temperature of the reservoir of course has a bearing upon these values.

The viscosity of the reservoir oil may be determined in a conventional manner, e.g., by obtaining an actual sample of the oil, or by reconstituting a sample of the oil and thereafter determining its viscosity value.

The relative permeabilities of the reservoir to oil and to the emulsion may also be obtained in a conventional manner, e.g., by measurement made on a core sample of the formation.

As mentioned earlier, the emulsion may be injected as a relatively narrow bank; but it is necessary that the bank be sufficiently large that water breakthrough (i.e., through the bank) may not occur until the reservoir has been traversed by the emulsion from the injection wells to the production wells. Conventional waterflooding rates may be used, for example about 0.2 to 2 feet of linear movement through the reservoir per day. Once the desired volume of emulsion has been injected into the reservoir, flood water in the form of fresh water, salt water, or the like may be injected as in a conventional waterflooding program. The waterflood is continued until further operation becomes uneconomical. At this time the waterflood may be discontinued.

It will be recognized that a number of variations in this procedure may be employed without departing from the spirit or scope of the invention. Thus it is contemplated that at least a portion of the viscous emulsion may be withdrawn from the reservoir at various points and recycled or returned to the reservoir at prior points within the reservoir. Any recycle solution should preferably be returned to a later point in the bank of the emulsion, although this is not entirely necessary since beneficial results may still be derived from the recycle operations, even though return to the bank itself is not realized.

The invention claimed is:

1. A process for displacing oil from a subterranean oil reservoir which comprises injecting as a first driving fluid an emulsion of water and oil in which the continuous phase has been thickened within a reservoir through an input well and in a quantity sufficient to displace oil from at least a portion of the reservoir and recovering displaced oil from an output well spaced from the input well.

2. A process as defined in claim 1 in which the quantity of emulsion injected is at least about 25 percent of the pore volume of the reservoir portion contacted by the emulsion.

3. A method as defined in claim 1 in which the mobility ratio of the emulsion to the reservoir oil is approximately one.

4. A flooding process for displacing oil from a subterranean oil reservoir which comprises injecting as at least the leading portion of the flood a water and oil emulsion in which the continuous phase of the emulsion has been thickened through an input well into a reservoir with said emulsion having a viscosity in the range from about 4 centipoises to about 1000 centipoises, driving said emulsion through said reservoir to displace oil from at least a portion of the reservoir, and recovering displaced oil from an output well spaced from the input well.

5. A process for displacing oil from a subterranean oil reservoir which comprises injecting as the leading driving fluid an emulsion of oil-in-thickened water within the reservoir through an input well in a quantity sufficient to displace oil from at least a portion of the reservoir, and recovering displaced oil from an output well spaced from the input well.

6. A process as defined in claim 5 in which the quantity of the emulsion injected is at least about 5 percent of the pore volume of the reservoir.

7. A method as defined in claim 5 in which the viscosity of the emulsion has been adjusted so that the mobility ratio of the emulsion to reservoir oil is approximately one.

8. A method as defined in claim 5 in which a surface active agent has been added to the thickened water in the oil-in-water emulsion.

9. A method as defined in claim 5 in which an ionic water soluble synthetic polymer has been added to the water.

10. A method as defined in claim 9 in which the ionic polymer is polyacrylic acid.

11. A method as defined in claim 9 in which the ionic polymer is polymethacrylic acid.

12. A flooding process for displacing oil from a subterranean oil reservoir which comprises injecting as at least the leading portion of the flood a water-in-oil emulsion in which the oil has been made more viscous by the addition of a thickener, through an input well into a reservoir, with said emulsion having a viscosity in the range of from about 4 centipoises to about 1000 centipoises, driving said emulsion through said reservoir to displace oil from at least a portion of the reservoir, and recovering displaced oil from an output well spaced from the input well.

13. A process as defined in claim 12 in which the quantity of the emulsion injected is at least about 5 percent of the pore volume of the reservoir portion contacted by the emulsion.

14. A process as defined in claim 12 in which the thickener is finely divided essentially oil in soluble solids.

15. A process as defined in claim 14 in which the thickener is carbon black.

16. A process as defined in claim 14 in which the finely divided solids have been pre-treated and have been rendered oil-wet.

17. A process for displacing oil from a subterranean oil reservoir which comprises injecting as a first driving fluid an oil-in-water emulsion in which the water has been made more viscous by the addition of finely divided solids through an input well to a reservoir, with said emulsion having a viscosity in the range of about 4 centipoises to about 1,000 centipoises and in a quantity sufficient to displace oil from at least a portion of the reservoir and recovering displaced oil through an output well spaced from the input well.

18. A process as defined in claim 17 in which the finely divided solids are hydrophilic.

19. A flooding process for displacing oil from a subterranean oil reservoir which comprises: injecting as at least the leading edge of the flood a water-in-oil emulsion in which the continuous phase has been thickened into a reservoir through an input well, driving said emulsion through said reservoir to displace oil from at least a portion of the reservoir to an output well spaced from the input well, and recovering such displaced oil from said output well.

20. A process for recovering oil from a subterranean oil formation which consists in: injecting a driving fluid consisting essentially of a water-in-oil emulsion in which the continuous phase has been thickened into a reservoir through an input well, forcing said driving fluid through said reservoir to displace oil from at least a portion of the reservoir and recovering the displaced oil from an output well spaced from the input well.

21. A flooding process for displacing oil from a subterranean oil reservoir which comprises: preparing a water-in-oil emulsion in which the amount of water by weight is about ten times that of the oil in the emulsion and in which the continuous oil phase of the emulsion has been thickened, said emulsion having a viscosity in the range from about four centipoises to about 1000 centipoises, injecting as at least the leading portion of the flood said water-in-oil emulsion through an input well into a reservoir; driving said emulsion through said reservoir to displace oil from at least a portion of the reservoir and recovering displaced oil from an output well spaced from the input well.

References Cited by the Examiner

UNITED STATES PATENTS

| | | | |
|---|---|---|---|
| 2,341,500 | 2/44 | Detling | 166—21 |
| 2,742,426 | 4/56 | Brainerd | 166—42 XR |
| 2,771,138 | 11/56 | Beeson | 166—9 |
| 2,793,189 | 5/57 | Schuessler. | |
| 2,800,962 | 7/57 | Garst | 166—9 |
| 2,827,964 | 3/58 | Sandiford et al. | 166—9 |
| 2,842,492 | 7/58 | Engelhardt et al. | 252—8.55 |
| 2,988,142 | 6/61 | Maly | 166—9 |

OTHER REFERENCES

Becher, P.: "Emulsions: Theory and Practice," page 125, N.Y., Reinhold Publishing Corp., 1957.

Schwartz, A., Perry, J., and Berch, J.: "Surface Active Agents and Detergents," vol. II, pages 155–156, N.Y., Interscience Publishers, Inc., 1958.

CHARLES E. O'CONNELL, *Primary Examiner.*

BENJAMIN BENDETT, *Examiner.*